(12) United States Patent
Mazur et al.

(10) Patent No.: US 12,492,778 B2
(45) Date of Patent: Dec. 9, 2025

(54) BALL AND SOCKET JOINT

(71) Applicant: Carrier Corporation, Palm Beach Gardens, FL (US)

(72) Inventors: Mateusz Mazur, Sopot (PL); Urszula Berendt, Gdańsk (PL)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 0 days.

(21) Appl. No.: 18/073,066

(22) Filed: Dec. 1, 2022

(65) Prior Publication Data
US 2023/0175637 A1    Jun. 8, 2023

(30) Foreign Application Priority Data

Dec. 3, 2021 (EP) .................................... 21212236

(51) Int. Cl.
*F16M 11/14* (2006.01)
*F16C 11/06* (2006.01)

(52) U.S. Cl.
CPC ............ *F16M 11/14* (2013.01); *F16C 11/06* (2013.01); *F16M 2200/021* (2013.01)

(58) Field of Classification Search
CPC .. F16M 11/14; F16M 2200/021; F16M 11/10; F16M 13/02; F16C 11/06; F16C 2202/32; F16C 2226/62; F16C 2370/00; F16C 11/0623; F16C 11/069; F16C 11/0695; F16C 11/10; F16C 11/0604; G01B 5/0004
USPC .............. 248/663, 481, 181.1, 181.2, 288.31
See application file for complete search history.

(56) References Cited

U.S. PATENT DOCUMENTS

| | | | |
|---|---|---|---|
| 1,962,548 A | 6/1934 | Zerk | |
| 2,012,669 A | 8/1935 | Lapsley | |
| 3,226,142 A | 12/1965 | Herbenar | |
| 3,278,203 A * | 10/1966 | Snyder | F21V 21/30 29/512 |

(Continued)

FOREIGN PATENT DOCUMENTS

| CN | 110630631 A | 12/2019 |
|---|---|---|
| DE | 1087045 B | 8/1960 |

(Continued)

OTHER PUBLICATIONS

European Search Report for Application No. 21212236.0; Issued Aug. 9, 2022; 16 Pages.

(Continued)

*Primary Examiner* — Muhammad Ijaz
(74) *Attorney, Agent, or Firm* — CANTOR COLBURN LLP (57) ABSTRACT

A ball and socket joint, including a pin located on either the socket or the ball and a groove located on the other of the socket or ball, the pin configured to engage the groove and translate along the length of the groove when the ball is located in the socket. An attachment surface for attaching a device to the ball and socket joint is also provided, and the pin and groove are arranged to prevent rotation of the ball about an axis that is parallel to the plane of the groove and extends through the attachment surface when the ball is located in the socket. A ball and socket joint includes a locking nut, the locking nut including a partly circular internal cross section and a second flat surface.

9 Claims, 5 Drawing Sheets

(56) References Cited

U.S. PATENT DOCUMENTS

| | | | |
|---|---|---|---|
| 3,493,252 A | 2/1970 | Watson et al. | |
| 3,984,075 A | 10/1976 | Bahner et al. | |
| 6,347,776 B1* | 2/2002 | Chuang | F16M 13/02 |
| | | | 403/114 |
| 7,007,901 B2 | 3/2006 | Kondo | |
| 7,405,557 B2 | 7/2008 | Spratte et al. | |
| 7,695,170 B1* | 4/2010 | Baldwin | F21V 21/29 |
| | | | 362/427 |
| 8,083,190 B1* | 12/2011 | Ma | F16M 11/105 |
| | | | 248/128 |
| 9,681,029 B2 | 6/2017 | Harrison | |
| 9,940,802 B2 | 4/2018 | Rosenkvist | |
| 10,082,726 B2 | 9/2018 | Fagerkvist | |
| 10,378,579 B2 | 8/2019 | Grziwok et al. | |
| 2008/0315867 A1 | 12/2008 | Spratte et al. | |
| 2009/0136288 A1* | 5/2009 | Ersoy | B60D 1/58 |
| | | | 702/34 |
| 2015/0176638 A1* | 6/2015 | Hebrard | F16C 17/246 |
| | | | 324/682 |
| 2017/0293316 A1* | 10/2017 | Birkelund | B60T 7/102 |
| 2020/0248740 A1* | 8/2020 | Tsai | B25B 23/0014 |
| 2020/0263728 A1* | 8/2020 | Balcerzak | F16M 11/2078 |
| 2022/0063513 A1* | 3/2022 | Grant | H04N 23/52 |
| 2023/0175637 A1* | 6/2023 | Mazur | F16C 11/0647 |
| | | | 248/127 |

FOREIGN PATENT DOCUMENTS

| | | |
|---|---|---|
| EP | 1872051 B1 | 2/2011 |
| FR | 2570774 A1 | 3/1986 |
| FR | 2812931 A1 | 2/2002 |
| WO | 2021148899 A1 | 7/2021 |

OTHER PUBLICATIONS

European Search Report for Application No. 21212236.0; Issued May 10, 2022; 16 Pages.

1 European Search Report for Application No. 24175495.1, Issued Nov. 5, 2024, 13 Pages.

\* cited by examiner

BALL AND SOCKET JOINT

FOREIGN PRIORITY

This application claims priority to European Patent Application No. 21212236.0, filed Dec. 3, 2021, and all the benefits accruing therefrom under 35 U.S.C. § 119, the contents of which in its entirety are herein incorporated by reference.

TECHNICAL FIELD OF INVENTION

The present invention relates to a ball and socket joint, a method of forming a ball and socket joint and a method of locking a ball and socket joint. The ball and socket joint may, for example, be for mounting a sensor to a surface.

BACKGROUND OF THE INVENTION

A ball and socket joint is a type of joint comprising a rounded ball configured to be located in a rounded socket. The ball and/or the socket may be connected to other components such as a shaft and movement of the ball within the socket allows rotary motion in every direction, albeit limited by the amount the component connected to the ball can tilt within the socket.

One benefit of a ball and socket joint is that a greater freedom of movement is provided.

Ball and socket joints in some applications such as automobiles are beneficial in that they allow rotary motion to be translated in a variety of planes, however, in certain applications or at certain times there may be a need to prevent movement of any kind of the ball within the socket. In this case the freedom of movement of the ball and socket joint is instead used for positioning of a component, which can then be locked into position. One such application is that of sensor installations that use advanced technologies for 2D or 3D space scanning. These sensors require proper positioning, and as the field of view (FoV) of sensors can be limited, it may be necessary to reposition sensors intermittently.

A ball joint may be suitable for positioning sensors as it allows the user to adjust it to face in any direction within the limits of the ball and socket joint. If the sensor was located on a vertical wall, it may be beneficial that ball and socket joint allows the sensor to be freely moved. However, in some applications it may be beneficial to have some control over the motion.

There is therefore a desire to provide a ball and socket joint which overcomes these drawbacks.

In addition, it may be necessary for sensors to be held in a fixed positing whilst they are operating. It is therefore desired to provide a system for locking a ball in position within a socket.

SUMMARY OF THE INVENTION

Viewed from a first aspect, there is provided a ball and socket joint comprising: a socket comprising an opening; a ball configured to be located in the socket; an attachment surface for attaching a device to the ball and socket joint; a pin located on either the socket or the ball, and a groove located on the other of the socket or ball, wherein the pin is configured to engage the groove and can translate along the length of the groove when the ball is located in the socket; and wherein the pin and groove are arranged to prevent rotation of the ball about an axis that is parallel to the plane of the groove and extends through the attachment surface when the ball is located in the socket.

The ball joint may be used for any installation that requires a ball and socket joint where rotation about an axis that is parallel to the plane of the groove and extends through the attachment surface is not required and/or desired to be restricted. In particular, the ball and socket joint may be a ball and socket joint for mounting a device such as a sensor, for example, the device may be a sensor. The sensor may for example be a sensor for 2D or 3D space scanning. For these types of sensors, restricting the sensor position, and in particular axial rotation of the sensor during positioning, may optimise performance and reduce human error in installation.

The ball and socket joint may further comprise a shaft connected to the ball and configured to extend in a direction away from the socket when the ball is located in the socket. The pin and groove may be arranged to prevent rotation of the ball about the longitudinal axis of the shaft when the ball is located in the socket.

The axis that is parallel to the plane of the groove and extends through the attachment surface may be coaxial with the longitudinal axis of the shaft.

The attachment surface may be connected to (including part of) the ball or the socket. For example, the attachment surface may be mounted directly to the ball. The attachment surface may be formed separately from the ball and mounted thereto, for example the attachment surface may be mounted to the ball and connected therefore using a fastening means or welded. Alternatively the attachment surface may be formed integrally with the ball and/or a flat surface on a part of the ball. The attachment surface may be any surface to which a device, such as a mechanical or electrical device, can be attached.

If the shaft is present, the attachment surface may be on the free end of the shaft. The attachment surface may be integrally formed with the shaft, e.g. they may be manufactured as a single unit. Alternatively, the attachment surface may be mounted to the free end of the shaft and connected thereto using a fastening means or welded, for example.

The plane of the attachment surface may be perpendicular to the plane of the groove.

The shaft and attachment surface may be arranged such that the longitudinal axis of the shaft is perpendicular to the plane of the attachment surface.

Alternatively, the shaft and attachment surface may be arranged such that the longitudinal axis of the shaft is at an angle between perpendicular and parallel to the plane of the attachment surface. For example, the angle between the longitudinal axis of the shaft and the plane of the attachment surface may be between 20-70 degrees, optionally 30-50 degrees, optionally 45 degrees.

The shaft may provide the attachment surface for a sensor. The attachment surface may be a mechanical interface for a device such as a sensor, and so the shaft may be considered to be providing a mounting point for a device such as a sensor. The attachment surface may comprise a sensor mounting plate for a sensor. The sensor mounting plate may comprise a surface to provide a mechanical interface with a sensor.

Viewed from a second aspect, there is provided a ball and socket joint comprising: a socket comprising an opening; a ball configured to be located in the socket; a pin located on either the socket or the ball, and a groove located on the other of the socket or ball, wherein the pin is configured to engage the groove and can translate along the length of the groove when the ball is located in the socket; and a shaft connected to the ball and configured to extend in a direction away from the socket when the ball is located in the socket; wherein the pin and groove are arranged to prevent rotation of the ball about the longitudinal axis of the shaft when the ball is located in the socket.

The second aspect may be the same as the first aspect in the case that the ball and socket joint comprises a shaft that provides an attachment surface, and that shaft is parallel to the plane of the groove and/or perpendicular to the axis of the pins. In the case of the second aspect the definition of the axis about which rotation is prevented is with respect to the shaft connected to the ball, rather than in relation to the attachment surface. As discussed previously, the shaft may provide the attachment surface for the device such as a sensor. In particular, an attachment surface may be connected to the free end of the shaft.

It will therefore be appreciated that the first and second aspect herein are linked and that the above and following statements and discussion apply to both the first and second aspects.

The invention according to the above aspects may therefore provide a ball and socket joint which prevents rotation of the ball about the axis that is parallel to the plane of the groove and extends through the attachment surface (which may also be the longitudinal axis of the shaft, if present), while allowing rotation about other axes. The attachment surface may comprise a flat face which may provide a sensor mounting plate as discussed above. In particular, the axis referred to above which is parallel to the plane of the groove and extends through the attachment surface may extend normal to the plane of the flat surface or sensor mounting plate of the attachment surface.

The axis which is parallel to the plane of the groove and extends through the attachment surface when the ball is located in the socket may be a first axis. In addition, when the ball and socket joint comprises a shaft connected to the ball, and wherein the shaft and attachment surface are arranged such that the shaft is perpendicular to the attachment surface, the longitudinal axis of the shaft is coaxial with the first axis and may be referred to as the first axis in relevant embodiments.

The ball and socket joint may allow rotation about a second axis that is perpendicular to the first axis. The ball and socket joint may allow rotation about a third axis that is perpendicular to the first axis and perpendicular to the second axis.

The second axis may be parallel (e.g. coaxial) to the axis of the pin. The axis of the pin may be coaxial with the rotational axis of the ball, wherein the rotational axis of the ball may extend through the centre of the ball.

The third axis may be perpendicular to the plane of the groove.

If the ball and socket joint was mounted to a vertical wall, it may allow movement of the ball, and hence the attachment surface and/or shaft, from side-to side. This may be by rotation about the second axis.

If the ball and socket joint was mounted to a vertical wall, it may allow movement of the ball, and hence the attachment surface and/or shaft, up and down. This may be by rotation about the third axis. The ball and socket joint would prevent any twisting of the attachment surface and/or shaft, i.e. rotation about the longitudinal axis of the shaft, i.e. about the first axis. This means that the when the ball is being located in position by a user (e.g. an installer), it may not be possible to rotate about the axis parallel to the plane of the groove and extending through the attachment surface and/or the shaft which could result in distorted measurements from a device (such a sensor) mounted using the ball and socket joint.

The invention may therefore reduce human error that could occur during mounting and positioning of sensors. It also means that the sensor may be positioned more quickly and easily as the user will not have to check whether or not the sensor is level once it is in the desired position.

The pin and groove may be arranged to allow rotation about the second axis parallel (e.g. coaxial) to the longitudinal axis of the pin. The pin and groove may also be arranged to allow rotation about the third axis perpendicular to a plane of the groove. Rotation about the third axis may result in the pin translating along the length of the groove.

The ball and socket joint may be for mounting to a mounting surface. For example, the socket may be connected to a surface mounting plate for being attached to the mounting surface. The mounting surface may be a vertical or horizontal surface, or it may be angled anywhere between vertical and horizontal, for example it may be at a 45 degree angle. The mounting surface may be a wall, ceiling or floor for example. The axis about which rotation is prevented (i.e. the first axis) may be perpendicular to the mounting surface (and hence surface mounting plate) when the ball and socket joint is mounted on the mounting surface. Meanwhile, the axes about which rotation is allowed (the second and third axes) may be parallel with the mounting surface when the ball and socket joint is mounted on the mounting surface.

In more detail, if for example the mounting surface is a vertical wall, and the attachment surface is located at a distance from the wall, the rotation about the axis that is parallel to the plane of the groove and extends through the attachment surface may be prevented by the pin and groove arrangement while the attachment surface may be able to be rotated such that it moves in an upward/downward direction and a side to side direction. Effectively, the invention may allow for the ball with the attachment surface to be fitted into the socket and moved to the required position without the possibility of rotating the attachment surface about the first axis. This feature may prevent human error in the positioning of a sensor which may be attached to the attachment surface.

In addition, if for example the mounting surface is a vertical wall, and the shaft is configured to extend outwardly in a direction away from the wall, the rotation about the axis of the shaft may be prevented by the pin and groove arrangement while the shaft may be able to be rotated such that it moves in an upward/downward direction and a side to side direction. Effectively, the invention may allow for the ball with the shaft to be fitted into the socket and moved to the required position without the possibility of rotating the shaft about its longitudinal axis. This feature may prevent human error in the positioning of a sensor which may be attached to the attachment surface connected to the free end of the shaft.

The longitudinal axis of the shaft connected to the ball may be parallel with the plane of the groove (in the case that the socket comprises the groove this may be when the ball is located within the socket in a neutral position).

By the ball being located in the socket it may be meant that at least a portion of the ball is located within the socket, i.e. it does not mean that the entire ball is located within the socket.

The socket may comprise the pin. For example the pin may be part of the socket, connected thereto and/or located in the socket. The ball may comprise the groove, for example the groove may be located on the surface of the ball. The groove may be a depression and/or recess in the surface of the ball. The groove on the ball may be arranged such that when the ball and socket joint is mounted to a vertical surface, the plane of the groove is vertical when the ball is located in the socket.

Alternatively, ball may comprise the pin, e.g. the pin may be located on the ball, and the socket may comprise the groove, e.g. the groove may be located in the surface of the socket. The groove in the socket may be arranged such that when the ball and socket joint is mounted to a vertical surface, the plane of the groove is horizontal.

When the ball is located in the socket, the pin may be located within the groove. The groove may be arranged (e.g. shaped and sized) to act as a guide for the pin. The pin may be able to move along the length of the groove. This may for example be the entire length of the groove. Alternatively, the movement of the pin within and along the groove may be limited to a defined section of the groove. For example, it may be necessary to restrict the movement about the axes of rotation to specific amounts. The pin may be able to move within the groove through an angle between 30 and 120 degrees, optionally between 30 and 90 degrees, further optionally between 30 and 45 degrees.

When the groove is located on the ball, the groove may extend continuously around the circumference of the ball between opposing surfaces of the attachment surface and/or shaft connected to the ball. In other words, the entire circumference of the ball, within a single plane, may comprise a groove aside from the section where the attachment surface and/or shaft is connected to the ball. The groove, when on the ball, may be located in a plane which is parallel to the longitudinal axis of the shaft connected to the ball and/or a plane which is perpendicular to the plane of the attachment surface.

Similarly, when the groove is located in the socket, it may extend around the circumference of the socket in a plane which is perpendicular to the opening of the socket, and/or attachment surface and/or parallel to the first axis or the longitudinal axis of the shaft when the ball is located in the socket in a neutral position. The groove, when located in the socket, may extend entirely from one side of the opening around the circumference to the other side of the opening.

The plane of the groove, when located in the socket, may be perpendicular to the plane that intersects the bottom of the socket.

The plane of the groove, when located on the ball, may be perpendicular to the plane that intersects the bottom of the socket when the ball is in the neutral position.

The neutral position of the ball referred to herein may be when the axis that is parallel to the plane of the groove and extends through the attachments surface, i.e. the first axis, is perpendicular to the mounting surface. Similarly, in instances where the ball and socket joint comprises a shaft which is perpendicular to the plane of the attachment surface, the neutral position may be when the longitudinal axis of the shaft (i.e. the first axis) is perpendicular to the device mounting plate and/or surface mounting plate and/or mounting surface.

Additionally or alternatively, the neutral position may be referred to as when axis that is parallel to the plane of the groove and extends through the attachments surface, i.e. the first axis is perpendicular to the opening of the socket. Similarly, in instances where the ball and socket joint comprises a shaft which is perpendicular to the plane of the attachment surface, the neutral position may be when the longitudinal axis of the shaft (i.e. the first axis) is perpendicular to the opening of the socket.

In the instance when the opening of the socket is parallel to the mounting surface, the two sets of definitions of neutral position herein would be the same. In the neutral position, the plane of the groove may be perpendicular to the mounting surface and/or the opening of the socket. For example, if the mounting surface was a vertical wall, the shaft would extend in a horizontal direction where its longitudinal axis (i.e. the first axis) is perpendicular with the plane of the wall.

In the case of the mounting surface being a vertical wall, when the joint is mounted on the vertical wall, the plane of the groove may be horizontal when the groove is located in the socket, alternatively the plane of the groove may be vertical when the groove is located on the ball. Similarly, in the case of the mounting surface being a horizontal surface, e.g. a ceiling, the plane of the groove may be vertical.

When the pin is located within the socket it may be located at a point wherein the longitudinal axis of the pin is parallel with the plane of the opening of the socket and/or the plane of the attachment surface and/or mounting plate. In other words, when the ball is located in the socket, the pin may be located in the groove such that when the ball and/or shaft and/or attachment surface is in a neutral position, the longitudinal axis of the pin is perpendicular to the first axis.

The pin may alternatively be located at a point which is intermediate between the point where the axis of the pin would be parallel with the opening of the socket, and the point where the axis of the pin would be perpendicular to the opening or parallel with the first axis. For example, the pin may be located such that its longitudinal axis is at a 45 degree angle to the mounting surface and/or the socket.

The attachment surface and/or shaft may be integrally formed with the ball, e.g. they may be manufactured as a single unit. Alternatively, the attachment surface and/or shaft may be formed separately from the ball and mounted thereto. In this case, the shaft may be mounted to the surface of the ball and connected thereto using a fastening means or welded, for example.

The pin may be a first pin, and the ball and socket joint may further comprise a second pin. The first and second pin may both be on one of either the socket or the ball. For example, if the groove is on the ball, then the first and second pin may be on the socket, alternatively, if the groove is on the socket then the first and second pin may be located on the ball.

The first and second pin may be diametrically opposite each other such that their axes are coaxial. The first and second pin may prevent rotation of the ball about the first axis. In addition, the first and second pin may allow rotation of the ball about the second axis parallel to the longitudinal axis of the first and second pins, and the third axis perpendicular to the plane of the groove.

The first and second pin may both be located such that their longitudinal axes are parallel to the mounting surface, and/or to the opening of the socket. The longitudinal axis of the first and second pin may also be perpendicular with the first axis, e.g. when the ball is in the neutral position.

The groove and pin may be arranged so as to disable rotation of the attachment surface and/or the shaft (and hence a sensor mounted on the attachment surface or shaft) during positioning of the ball within the socket and hence during positioning of the sensor.

The groove may comprise a bottom surface and a first and second side walls. The first and second side walls may be perpendicular to the bottom surface such that the groove forms a U-shaped channel in the socket or ball. The bottom surface of the groove may be flat in the cross section. Alternatively the bottom surface of groove may be rounded.

The depth of the groove may be sized to house the entire length of the pin(s). Alternatively, the depth of the groove may be sized to house only a portion of the pin(s). The portion of the pin(s) housed in the groove may be sufficient to prevent movement of the pin in any direction other than the direction of the groove.

The pin(s) may be cylindrical. The pin(s) may have a flat end surface that engages with the bottom surface of the groove when the ball is urged into the socket. Alternatively, the pin(s) may have a rounded end, or the end shape may fit with the cross sectional shape of the groove. The end surfaces of the pin may be shaped to fit within the shape of the groove, e.g. if the bottom surface of the groove comprises a flat surface, the end surface of the pin(s) may be flat, similarly, of the bottom surface of the groove comprises a rounded surface, the end surface of the pin may be rounded. This may provide an improved interaction between the pin(s) and the groove so that the pin is able to translate along the length of the groove more easily.

The pin(s) may be configured to contact the bottom surface and/or side walls of the groove when the ball is located within the socket. This may be when the ball is urged into the socket.

The pin(s) may be sized to match the width (i.e. distance between the side walls) of the groove. This has the advantage that undesired movement of the ball within the socket may be limited or prevented.

Alternatively, the end surface of the pin may be configured to be spaced from the bottom surface of the groove when the ball is located within the socket. However, in this instance the end surface of the pin may still be located between the side walls of the groove. Moreover, the side walls of the pin(s) may be spaced from the side surfaces of the groove. This has the advantage that the ball and socket joint may be easier and simpler to manufacture and the assembly process may also be simplified.

The ball and/or shaft may be hollow. The ball and/or shaft may have a thin wall, e.g. a wall less than 10 mm or less than 5 mm thickness. The ball and/or shaft may each have an internal dimension and an external dimension, and the difference between the internal dimension and the external dimension of the ball and/or shaft may be the wall thickness of the hollow ball and/or shaft.

Having a hollow ball may be beneficial as it may allow a decrease in the weight of the ball and socket joint and/or reduce the manufacturing time and cost.

Alternatively the ball may be solid.

The socket may be hemispherical.

The opening of the socket may be parallel with the mounting surface. Alternatively, the opening of the socket may be angled relative to the mounting surface. In this instance, one side of the socket may extend further from the mounting surface than another side of the socket. In this case, the shaft may still be perpendicular to the opening, or it may be angled to the opening (e.g. so as to be perpendicular to the mounting surface and/or device or surface mounting plate).

Alternatively, the socket may form more or less of a sphere than a hemisphere. For example, the socket may be a spherical cap. The edge of the socket may be in a single plane parallel to the mounting surface of the ball and socket joint.

The ball and/or socket (and/or any other part of the joint) may be formed of a conductive material such as metal.

Alternatively, the ball and/or socket and/or any other part of the joint may comprise any material, in particular a plastic or composite material. For example the ball and/or socket may be injection moulded plastic components.

The surfaces of the ball and socket joint may be conductive, e.g. metallized, whereby they are coated with a conductive material such as metal. All of the surfaces of the ball and socket joint may be coated with metal. Alternatively, the conductive material (e.g. metallization) may cover at least (or only) the surfaces of the pin and the groove which are configured to be in contact with each other.

The pin and/or surface of the groove may be formed of or coated with a conducting material.

The ball and socket may be formed of an insulating material.

The ball and socket joint may comprise a tamper circuit. The tamper circuit may be for detecting if the joint is tampered with, e.g. if the ball is moved within the socket and/or removed from the socket. The tamper circuit may be used to detect if a device, e.g. sensor, mounted using the joint is removed.

The conductive surfaces (e.g. metalized surfaces) of the ball and the socket may provide a connection for the tamper circuit when the ball is located within the socket. The connection between the conductive material, e.g. metal, on the pin surfaces and the conductive material, e.g. metal, on the surface (e.g. bottom surface and/or sides) of the groove may provide a connection for the tamper circuit.

The tamper circuit may extend through the groove and into the surface mounting plate. The joint may be arranged so that when contact between the surface of the pin(s) and the groove is made, the tamper circuit is complete and therefore activated. For the tamper circuit to be completed, it may be required that the ball is urged into the socket under force. The tamper circuit may be for detecting if the urging of the ball into the socket is reduced and/or removed.

The tamper circuit may comprise an electrical connection between the attachment surface, e.g. the device mounting plate, and the surface mounting plate for mounting on the mounting surface. The electrical connection may extend from the attachment surface, e.g. along the shaft, such as along the surface of the shaft, to the surface, e.g. bottom surface, of the groove, through the pin(s) (e.g. when the ball is urged into the socket), and through the socket to an external connection point.

If the ball is manoeuvred within the socket such that physical contact between the pin and groove (e.g. bottom surface of the groove) is lost, the tamper circuit may be broken. If the tamper circuit is broken an alarm may be activated. The contact may be lost if the force urging the ball into the socket is modified, e.g. reduced beyond a threshold point. This may result in a break in the tamper circuit, e.g. loss of contact between the surface of the pin(s) and the groove.

The above system may provide a means to alert and/or notify users of the sensors in response to the sensor being tampered with. For example, if an unauthorised person attempts to remove the ball from the socket, or adjust its position, such that the connection of the tamper circuit is broken, an alarm may be activated. Additionally or alternatively, the sensor may adjust the measurements taken in response to the tamper circuit being broken. For example, the data related to the sensor may be marked such that it is clear that the sensor has been tampered with.

The ball and socket joint may comprise a locking means, e.g. a locking nut, for locking the ball within the socket. The ball may be locked in position in the socket using the locking nut. The ball may comprise a non-spherical surface and the locking nut may have an opening with a non-circular cross section. The locking nut may be sized such that in a first alignment the ball is able to pass through the opening, and such that in a second, different alignment, the ball is not able to pass through the opening.

For example, the ball may comprise a first flat surface. The locking nut may comprise an opening with a partly circular internal cross section and a second flat surface. The locking nut may be sized such that when the first flat surface of the ball and the second flat surface of the locking nut are aligned the ball is able to pass through the opening, and such that when the first flat surface and the second flat surface are offset from each other the ball is not able to pass through the opening.

The presence of such a locking nut may be of independent patentable significance to the above described pin and groove arrangement of the first and/or second aspect.

Thus viewed from a third aspect, there is provided a ball and socket joint, the ball and socket joint comprising: a socket; a ball configured to be located within the socket, wherein the ball comprises a first flat surface; and a locking nut for locking the ball within the socket, wherein the locking nut comprises an opening with a partly circular internal cross section and a second flat surface, and wherein the locking nut is sized such that when the first flat surface of the ball and the second flat surface of the locking nut are aligned the ball is able to pass through the opening, and such that when the first flat surface and the second flat surface are offset from each other the ball is not able to pass through the opening.

The joint of the third aspect may have one, or more, or all of the above features described in relation to the first and second aspects, including both the essential and optional features.

For instance, the ball and socket joint of the third aspect may comprise a pin located on either the socket or the ball, and a groove located on the other of the socket or ball, wherein the pin may be configured to engage the groove and may be able to translate along the length of the groove when the ball is located in the socket. The ball and socket joint may further comprise a shaft connected to the ball which may be configured to extend in a direction away from the socket when the ball is located in the socket, wherein the pin and groove are arranged to prevent rotation of the ball about the longitudinal axis of the shaft.

Alternatively, or in addition, the ball and socket joint of the third aspect may comprise an attachment surface for attaching a device to the ball and socket joint; a pin located on either the socket or the ball, and a groove located on the other of the socket or ball, wherein the pin may be configured to engage the groove and may be able to translate along the length of the groove when the ball is located in the socket; wherein the pin and groove are arranged to prevent rotation of the ball about an axis that is parallel to the plane of the groove and extends through the attachment surface when the ball is located in the socket.

The following features and discussion is applicable to one or more or all of the joint of the first and second aspects and the joint of the third aspect.

When the first flat surface of the ball and second flat surface of the locking nut are offset from each other, the locking nut may be used to lock the ball in the socket and/or urge the ball into the socket. This may cause contact of the pin(s) with the groove to complete the tamper circuit (i.e. the tamper circuit as described above). If the locking nut is rotated so that the first flat surface and second flat surface are aligned, the ball may move (at least partly) out of the socket which may break the tamper circuit. If the locking nut is unscrewed, so as to allow the ball to move relative to the socket, the tamper circuit may be broken (e.g. due to the weight of the device mounted using the joint pulling the pin and groove apart). The alarm may then be activated in response to this as discussed above.

The locking nut may be configured to be rotatable (e.g. about an axis perpendicular to the plane of the opening of the locking nut) between a first position where the first flat surface of the ball and second flat surface of the locking nut are aligned and a second position where the first flat surface and the second flat surface are offset from each other. By offset it may mean angularly offset about the axis perpendicular to the plane of the opening of the locking nut and/or by aligned it may mean angularly aligned about the axis perpendicular to the plane of the opening of the locking nut.

The locking nut may be rotatable relative to the ball and socket, in particular, the joint may be arranged so that the ball may remain in a fixed position in the socket as the locking nut is rotated.

The locking nut may provide a means for locking the ball within the socket so that it cannot be removed from the socket. The locking nut may also provide a means for locking the ball in a fixed position within the socket so that the ball cannot move relative to the socket. This may lock the attachment surface, e.g. device mounting surface, in a fixed position relative to the surface mounting plate.

The joint may be arranged so that to lock the ball within the socket the user may align the first and second flat surfaces (e.g. by rotating the locking nut and ball relative to each other) so that the ball can be located within the socket (by inserting the ball through the locking nut) and then rotate the locking nut so that the first and second flat surfaces are offset from each other. Once the first and second flat surfaces are offset, the ball may not able to pass through the opening of the locking nut such that the ball may be locked within the socket.

The locking nut may be used to urge the ball into the socket such that the ball is held in a fixed position relative to the socket, e.g. by friction between the ball and the socket. This may be achieved by screwing the locking nut onto the socket. This may clamp the joint so that the ball is fixed relative to the socket.

The locking mechanism described herein may be beneficial as it may mean that the ball may be held within the socket and the position of the ball within the socket may be locked and/or adjusted easily without the need for any additional tools. To achieve this the user may position the locking nut so that the first flat surface and the second flat surface are aligned to allow insertion of the ball into the socket, move the ball within the socket to the required position (e.g. to position the attachment surface, e.g. device mounting surface, to the desired position), use the locking nut to urge the ball into the socket so it is fixed in the required position and/or rotate the locking nut to a position where the first flat surface and second flat surface are offset from each other to lock the ball within the socket.

The re-positioning may occur after installation. This may be of particular use if the joint is used for mounting a device such as a sensor. This is so the area the field of view of the sensor is directed at can be manually adjusted as required.

The locking nut may be arranged so that it can be rotated relative to the ball and/or socket without any tools, e.g. by rotating the nut by hand. Thus the joint may be arranged so that it can be formed (e.g. built) and/or locked without the use of tools, e.g. just with manual rotation of the locking nut relative to the ball and socket.

The ball and socket joint may be made up of three components; the socket (which may comprise a surface mounting plate, a cavity for locating the ball therein and the pins), the ball (which may comprise the groove, the attachment surface, e.g. device mounting plate and shaft, if present), and the locking nut.

In other words the joint may consist of these three parts. This may ease manufacturing as a small number of parts make up the joint.

The joint may be arranged so that it does not require any additional screws or other means (other than the locking nut) to fix the ball relative to the socket.

The combination of the locking nut and the pin and groove of the first/second aspect, may together mean that the ball can easily be repositioned without the need for additional tools, and avoid human error in repositioning the ball which may be caused by axial rotation of the ball about the first axis. This combination may also facilitate the provision of a tamper circuit as described above.

The ball may comprise a substantially spherical shape comprising a single cut away portion to form the first flat surface. The cut-away portion forming the first flat surface may account for less than 30% of the volume of the sphere, optionally less than 20%, optionally less than 10%.

The diameter of the ball referred to herein may be considered to be the diameter of the overall sphere if the flat surface was not present. In other words, the first flat surface may be considered to be formed from a portion of the ball being cut away from the sphere. Therefore, assuming the flat surface is not present, the diameter of the ball would simply be the diameter of the sphere. The cross section of the ball in a plane which includes the first flat surface and passes through the centre of the ball, may be a partly circular cross section, with a single flat side. The distance between a first rounded portion of the cross section, which is for example 90 degrees offset from the first flat portion, to a second rounded portion which is diametrically opposite the first flat portion may be equivalent to the diameter of the ball. A line drawn between the first rounded portion and the second rounded portion may pass through the centre of the sphere.

The minimum dimension of the ball may be the distance between the first flat surface and the surface of the ball which is diametrically opposite the first flat surface. The maximum dimension of the ball may be the diameter of the ball.

The socket may comprise a threaded surface to which the locking nut can engage.

The locking nut may comprise a threaded surface that can engage with the threaded surface of the socket.

The socket may comprise a collar portion comprising an internal surface and an outer surface. The internal area of the collar portion may form at least part of the socket cavity in which the ball may be located. The collar portion may be cylindrical. The outer surface of the collar portion may comprise the threaded surface of the socket. Alternatively the inner surface of the collar portion may comprise the threaded surface of the socket.

The opening of the locking nut comprises an opening with a partly circular internal cross section and a second flat surface and this shape may extend along the length of the locking nut. Alternatively, the locking nut may comprise a neck and flange. The shape of the opening may be formed by the flange, wherein the flange may extend inwardly from the neck of the locking nut. The neck of the locking nut may form the majority of the length of the locking nut. The flange may form the substantially circular opening comprising the second flat surface.

The flange may be located at a portion of the locking nut located away from the socket when the locking nut is mounted to the socket.

The internal surface of the neck may comprise the threaded surface of the locking nut. The threaded surface of the socket may be referred to as a first threaded portion and the threaded surface of the locking nut may be referred to as a second threaded surface. The joint may be arranged so that if the locking nut is rotated relative to the socket (e.g. in a clockwise direction) the first and second threaded portions may engage with each other and may be arranged so that the locking nut is urged in a direction toward the socket to lock the ball in the socket.

In an alternative iteration, the first threaded portion of the collar portion may be located on the inner surface of the collar portion. The second threaded portion may be located on the outer surface of the locking nut. As such the outer surface of the locking nut may be cylindrical to match the inner surface of the collar portion. The inner surface of the locking nut may be shaped according to the present invention whereby it comprises a partly circular internal cross section with the first flat surface.

The opening of the locking nut is partly circular and the second flat surface may be formed from a portion of the circular opening effectively being filled in. The diameter of the opening of the locking nut is considered to be the diameter of the circular portion assuming the second flat surface is not present and hence the opening has a circular cross section.

The minimum internal dimension of the locking nut (i.e. the minimum internal dimension of the opening of the locking nut) may be the distance between the second flat surface and the surface diametrically opposite the second flat surface.

The locking nut may be sized such that the minimum internal dimension of the locking nut is larger than the minimum dimension of the ball. This may allow the ball to pass through the locking nut when the first flat surface and the second flat surface are aligned. In the case of the ball being hollow, the minimum dimension of the ball referred to may be the minimum external dimension of the ball, i.e. on the outer surface.

The minimum internal dimension of the locking nut may be smaller than the diameter of the ball. This may prevent the ball from passing through the locking nut when the first flat surface and the second flat surface are offset from each other.

The opening of the locking nut and an opening of the socket may be configured to be coaxial when the locking nut is locked to the socket.

The locking nut may be configured to rotate about a first axis extending through the centre of the opening perpendicular to the plane of the opening. The ball may be located within the socket such that the centre point of the ball is located on the first axis.

The joint may be arranged (i.e. the nut and ball positioned) so that the first flat surface and the second flat surface may be circumferentially offset from each other such that the ball is not able to pass through the opening in the locking nut. In this position, the first flat surface and the second flat surface may be at a different point around the circumference of the respective locking nut and ball. The second flat surface on the locking nut may configured to engage with the rounded portion of the ball in the offset position. This may prevent the ball from being removed from the socket.

When the ball is locked in the socket, the first flat surface and the second flat surface may be angularly offset from each other. The first flat surface and the second flat surface may be offset from each other by any angle greater than zero, i.e. not aligned, to achieve the locking of the ball within the socket. For example the first flat surface and the second flat surface may be offset from each other by an angle of at least 15 degrees. Optionally, the first flat surface and the second flat surface may be offset by at least 45 degrees, optionally about 90 degrees.

In an offset position, the locking nut may be configured to urge the ball into the socket with a force sufficient to prevent any movement of the ball within the socket.

The ball may further comprise a third flat surface diametrically opposite the first flat surface. Similarly, the opening of the locking nut may comprise a fourth flat surface diametrically opposite the second flat surface.

The locking nut may be configured such that when the first flat surface and the second flat surface are aligned or offset, the third flat surface and the fourth flat surface are also aligned or offset respectively.

The plane of the first flat surface (and plane of the third flat surface if present) of the ball may be parallel to the plane of the groove (if the groove is present on the ball).

The locking nut may also be used to engage the tamper circuit described above. Thus the features of the tamper circuit disclosed in connection with the first and second aspects may also be present in the ball and socket joint of the third aspect.

Accordingly, the joint may be arranged so that when the locking nut locks the ball within the socket, the ball and socket joint may be configured such that the tamper circuit is engaged. In particular, locking nut may be used to cause the conductive, e.g. metallized, pin(s) and groove to be in contact with each other so as to complete the circuit. When the locking nut is rotated to be in a position such that the ball is not fixed within the socket the ball may be allowed to move relative to the socket. This movement may cause the pin(s) to lose electrical contact with the groove and break the tamper circuit.

The present invention may provide a method of forming a ball and socket joint according to the first aspect and/or the second aspect and/or the third aspect.

Viewed from a fourth aspect, there is provided a method of forming a ball and socket joint comprising: providing a socket comprising an opening; providing a ball for locating into the socket, providing an attachment surface for attaching a device to the ball and socket joint; providing a pin on either the socket or the ball, and a groove on the other of the socket or the ball; and inserting the ball into the socket, such that the pin engages the groove and is able to translate along the length of the groove; and wherein the pin and groove are arranged to prevent rotation of the ball about an axis that is parallel to the plane of the groove and extends through the attachment surface.

The ball and socket joint according to this aspect may include any of the features disclosed in connection with the first aspect and/or second aspect and/or third aspect. In particular, the device may be a sensor. The ball and socket joint may comprise a shaft connected to the ball, wherein the attachment surface may be provided on the end of the shaft.

The method may further include the step of adjusting the position of the ball within the socket. The ball and socket may be rotated such that the pin translates along the length of the groove. The ball may therefore be rotated about a second axis parallel to the longitudinal axis of the pin. The ball may also be rotated about a third axis perpendicular to the plane of the groove.

This method therefore allows a device such as a sensor to be positioned without the risk of the device being rotated the axis that is parallel to the plane of the groove and extends through the attachment surface, i.e. the first axis. In the case of the device being a sensor, this may prevent the sensor readings from being distorted.

The method may further comprise mounting the ball and socket joint to a mounting surface. The mounting surface may be a vertical surface such as a wall, or a horizontal surface such as a ceiling.

The method may further comprise wherein the pin is a first pin, and providing a second pin. The first pin and second pin may be provided so that they are diametrically opposite each other on either one of the ball or the socket.

Viewed from a fifth aspect, there is provided a method of forming a ball and socket joint comprising: providing a socket comprising an opening; providing a ball for locating into the socket and a shaft connected to the ball, providing a pin on either the socket or the ball, and a groove on the other of the socket or the ball; and inserting the ball into the socket with the shaft extending in a direction away from the socket, such that the pin engages the groove and is able to translate along the length of the groove; and wherein the pin and groove are arranged to prevent rotation of the ball about the longitudinal axis of the shaft.

The present invention may provide a method of locking a ball and socket joint according to the first aspect and/or the second aspect and/or third aspect.

Viewed from a sixth aspect, there is provided a method of locking a ball and socket joint comprising: providing a socket; providing a ball comprising a first flat surface; and providing a locking nut for locking the ball within the socket, the locking nut comprising an opening with a partly circular internal cross section and a second flat surface, the locking nut being sized such that when the first flat surface and the second flat surface are aligned the ball is able to pass through the opening, and such that when the first flat surface and the second flat surface are offset from each other the ball is not able to pass through the opening; aligning the first flat surface and the second flat surface; inserting the ball through the opening of the locking nut into the socket; rotating the locking nut such that the first flat surface and second flat surface are offset from each other so as to lock the ball in the socket.

The method may comprise connecting the locking nut to the socket, e.g. by engaging a threaded surface on the locking nut with a threaded surface on the socket.

The locking nut may be arranged so that when the threaded surfaces are engaged and the locking nut is rotated relative to the socket it is pulled towards the socket.

The method may comprise further rotating the locking nut to urge the ball into the socket so as to lock the ball in a fixed position within the socket.

The method may comprise rotating the locking nut into a first position. In the first position the locking nut may be located so that the ball can be inserted through the locking nut into the socket. In the first position, the second flat surface may be positioned so that when the first flat surface of ball is aligned with the second flat surface the pin(s) and groove (if present) are aligned. In the first position the second flat surface of the locking nut may be circumferentially offset from the groove and/or pin (whichever of the two is located in the socket) by 90°.

The method may comprise rotating the locking nut into a second position. This step may be performed after the ball has been inserted through the locking nut in the first position. When the locking nut is in the second position, the ball may not be able to be pulled out of the socket. In other words, when the locking nut is in the second position it may lock the ball in the socket. However, when the locking nut is in the second position the ball may still be able to move within the socket. This may allow positioning of a sensor mounted using the joint without the ball falling out of the socket. In the second position, the second flat surface of the locking nut may be circumferentially offset from the first flat surface of the ball when the ball is located in the socket and optionally if present, when the pin(s) and groove are engaged (i.e. the pin(s) is (are) seated within the groove).

The method may comprise rotating the locking nut into a third position. This may be performed after the sensor (or other device) mounted using the joint has been moved to the desired position. The method may comprise rotating the locking nut from the first and/or second position to the third position. The method may comprise rotating the locking nut from the first position, through the second position (perhaps without stopping at the second position) to the third position. Rotating the locking nut from the first and/or second position to the third position may move the locking nut (and hence the ball if in the socket) towards the socket. In the third position the locking nut may urge the ball into the socket so that the ball is held in a fixed position (e.g. by friction) within the socket. In the third position (similarly to the second position) the second flat surface of the locking nut may be circumferentially offset from the first flat surface of the ball when the ball is located in the socket and optionally if present, when the pin(s) and groove are engaged (i.e. the pin(s) is(are) seated within the groove). Thus in both the second and third position the ball may be locked in the socket. However, the difference between the second and third position may be that in the second position the ball may be able to be moved within the socket (e.g. to allow change of the position of the shaft and hence device (e.g. sensor) mounted using the joint.

Moving from the first and/or second position to the third position may cause the tamper circuit to be completed.

The tamper circuit may be arranged to sense when the locking nut is moved from the third position towards and/or to the second and/or first position. This may be because movement of the locking nut from the third position (in which the ball is urged into the socket) towards the second and/or first position may break the tamper circuit. This may be because movement of the locking nut from the third position (in which the ball is urged into the socket) towards the second and/or first position may break electrical contact between the ball and socket (e.g. via conductive pin(s) and groove, if present).

This aspect of the invention may include one or more or all of the above described features discussed in connection with the first, second, third, fourth or fifth aspects of the invention. The ball and socket joint of the first and/or second and/or third aspect may be used to perform the method of the fourth and/or fifth and/or sixth aspect of the invention. Thus, whilst these aspects may be independently patentable all of the features discussed in relation to each aspect may be equally applicable to each of the other aspects of the invention.

BRIEF DESCRIPTION OF THE DRAWINGS

Certain preferred embodiments of the present invention will now be described, by way of example only, with reference to the following drawings in which.

DETAILED DESCRIPTION OF THE INVENTION

Figure 1:
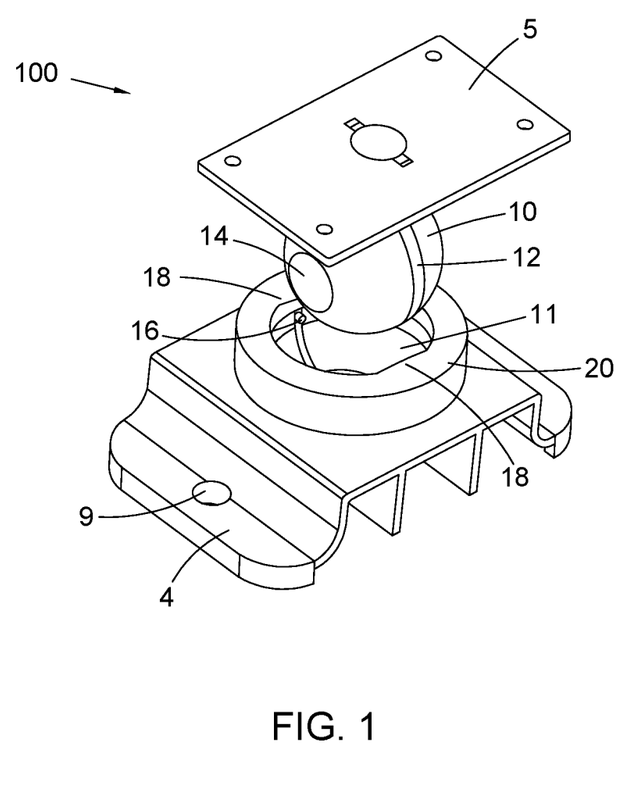
FIG. 1 shows a ball and socket joint prior to assembly.

FIG. 1 shows a ball and socket joint 100 in a disassembled state. The ball and socket joint comprises a ball 10 and a socket 11, wherein the ball 10 is configured to be located in the socket 11. The ball 10 further comprises a shaft 24 (see FIGS. 4, 6a and 6b) which is connected to the ball 10 and arranged to extend in a direction away from the socket 11 when the ball 10 is mounted in the socket 11.

The ball and socket joint 100 also comprises an attachment surface in the form of a sensor mounting plate 5 to act as the mounting point for a sensor. The sensor mounting plate 5 comprises a mechanical interface to which a sensor can be connected. The mechanical interface may also include the electrical connections for the sensor.

The ball and socket joint 100 further comprises a surface mounting plate 4 for mounting the ball and socket joint 100 to a mounting surface (not shown). The mounting surface may be a vertical or horizontal surface, such as a vertical wall or ceiling respectively. Alternatively, the mounting surface may be an angled surface.

The ball 10 of the ball and socket joint 100 is substantially spherical, but includes a first flat surface 14 formed from a portion cut away from the sphere. The embodiment depicted in FIG. 1 also comprises a second flat surface, although the second flat surface cannot be seen in this figure. The second flat surface is located at the diametrically opposite point to the first flat surface 14. The ball 10 further comprises a groove 12 which extends about the circumference of the ball 10.

The socket 11 further comprises a first pin 16 located adjacent to the opening of the socket. The socket 11 further comprises a second pin (not visible in FIG. 1) located diametrically opposite the first pin 16, i.e. it is also adjacent to the opening of the socket 11 and is coaxial with the first pin 16. The axis of the first and second pin is parallel with the plane of the opening of the socket 11.

The ball and socket joint 100 further comprises a locking nut 20 which is located over the socket 11. The socket comprises a threaded collar portion 22 as depicted in FIGS. 3, 4, 6a and 6b and the locking nut 20 comprises a threaded inner surface which engages with the threaded collar portion 22.

The locking nut 20 comprises a cylindrical neck portion which extends to a top portion of the locking nut 20, which is the portion located opposite the mounting plate 4 end of the joint 100. The top portion comprises a flange 17 (see FIGS. 6a and 6b). The flange 17 extends inwardly from the neck of the locking nut 20. The inner surface of the flange 17 is partly circular and includes a first and second flat surface 18. The first and second flat surfaces 18 are diametrically opposite each other as shown in FIG. 1.

The inner surface of the flange is sized so that when the first and second flat surface 18 of the flange 17 of the locking nut 20 are aligned (circumferentially or angularly) with the first and second surface 14 of the ball 10, the ball 10 is able to pass through the flange 17 of the locking nut 20.

Figure 2:
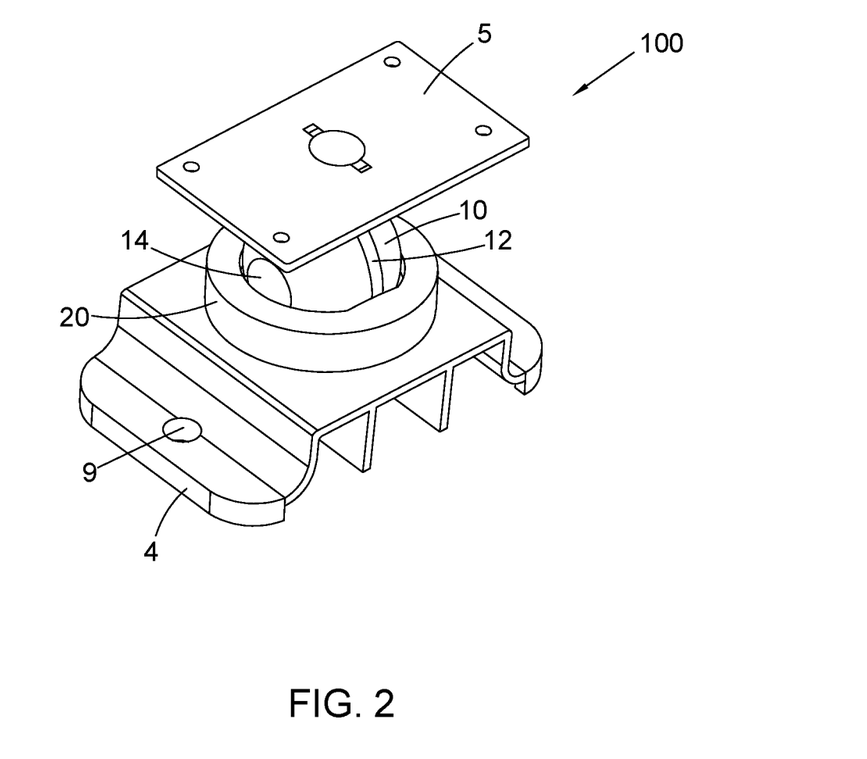
FIG. 2 shows the ball and socket joint in a neutral position.

Once the ball 10 is located within the socket 11 the locking nut 20 can be rotated so the first and second flat surfaces 18 on the locking nut 20 are offset from the first and second flat surfaces 14 on the ball as shown in FIG. 2.

In FIG. 2, the ball 10 is located within the socket 11 and the locking nut 20 is arranged so that the first and second flat surfaces 18 of the locking nut 20 are offset from the first and second flat surfaces 14 of the ball 10. As such, the first and second flat surfaces 18 of the locking nut 20 engage with the rounded portion of the ball as shown in FIG. 2. The distance between the first and second flat surfaces 18 on the locking nut 20 is smaller than the diameter of the ball 10 (the diameter of the ball is considered to be the diameter of the spherical portion of the ball, i.e. the diameter of the ball if the flat surface were not present). Therefore, when the flat surfaces are offset from each other as shown in FIG. 2. the ball 10 is not able to pass through the locking nut 20 so that the ball is locked into place.

In addition, the threaded collar portion 22 and the threaded inner surface of the locking nut 20 means that as the locking nut 20 is rotated with respect to the collar portion 22, the locking nut will move towards the base of the socket 11. The locking nut 20 therefore provides a force which urges the ball 10 into the socket 11 as it is rotated.

As discussed in connection with FIG. 1 above, the socket 11 comprises a first and second pin 16 and the ball 10 comprises a groove 12. When the ball 10 is located within the socket 11, the first and second pins 16 are configured to be located in the groove 12 as shown in FIGS. 3 and 4.

Figure 3:
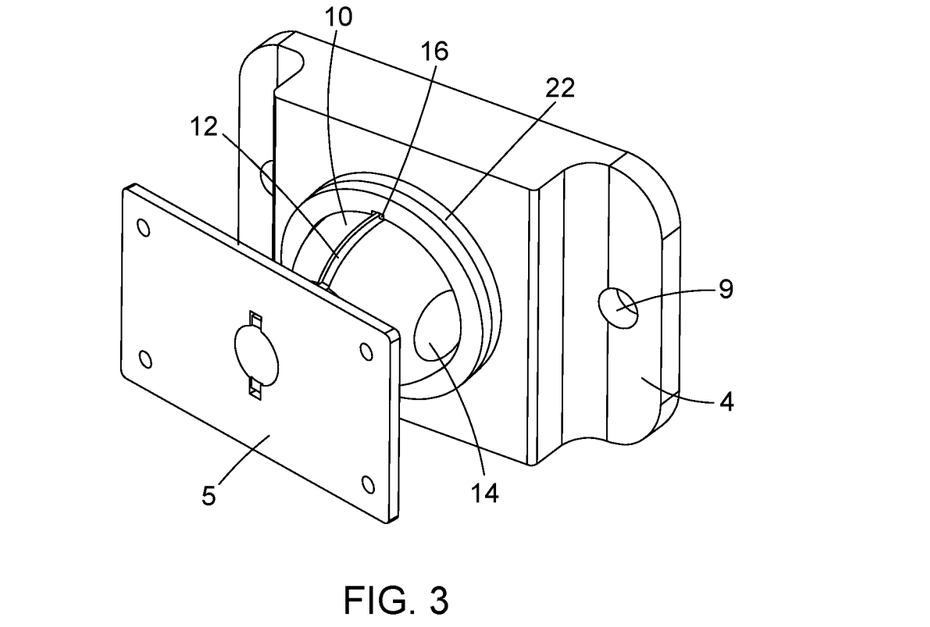
FIG. 3 shows the ball and socket joint without the locking nut present in the neutral position.
Figure 4:
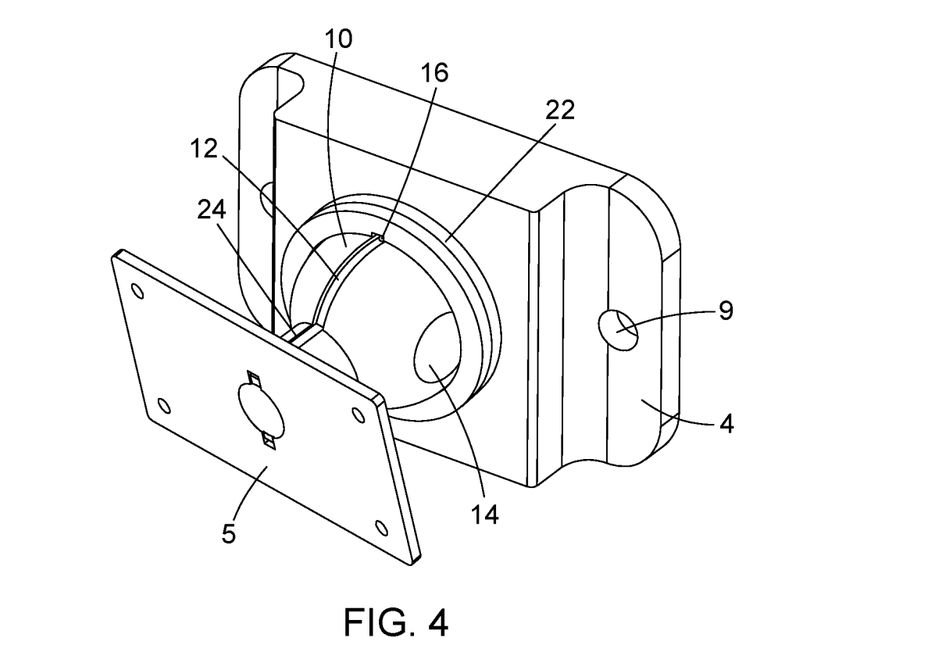
FIG. 4 shows a ball and socket joint without the locking nut present in a non-neutral position.

FIG. 3 shows the ball and socket joint 100 with the locking nut 20 removed. FIG. 3 therefore also shows the threaded collar portion 22. The ball 10 is located within the socket 10 and one of the pins 16 is shown as being located within the groove 12. The pin 16 is able to translate along the length of the groove and as such the ball 10 is able to rotate so that the pin 16 moves along the length of the groove 12 whereby the ball 11 can rotate to move to the position shown in FIG. 4. In addition, the ball 10 is also able to rotate about the axis of the pin 16. In this plane of rotation the pin 16 remains at the same position in the groove 12 and it allows the ball to rotate side to side.

The pins 16 and groove 12 therefore allow rotation about an axis perpendicular to the longitudinal axis of the shaft and parallel to the axis of the pins 16 and about an axis perpendicular to the plane of the groove 12. The pins 16 and the groove 12 prevent rotation about an axis that is parallel to the plane of the groove and extends through the attachment surface, i.e. sensor mounting plate 5. This axis in this embodiment is also the longitudinal axis of the shaft 24. This is due to the arrangement of the groove 12 and pins 16 and as will be appreciated from FIGS. 3 and 4, if a user attempted to rotate the ball 10 about the longitudinal axis of the shaft 24, the groove 12 and pins 16 would prevent any rotation.

The shaft 24 may be omitted from the embodiment and the sensor mounting plate 5 may be connected directly to the ball 10. It will therefore be appreciated that the arrangement of the groove 12 and pins 16 prevent rotation about an axis that is parallel to the plane of the groove 12 and extends through the attachment surface, i.e. the sensor mounting plate 5, in the depicted embodiment as well as in embodiments where the shaft 24 is omitted or those in which the shaft extends at an angle to the plane of the groove.

Figure 5:
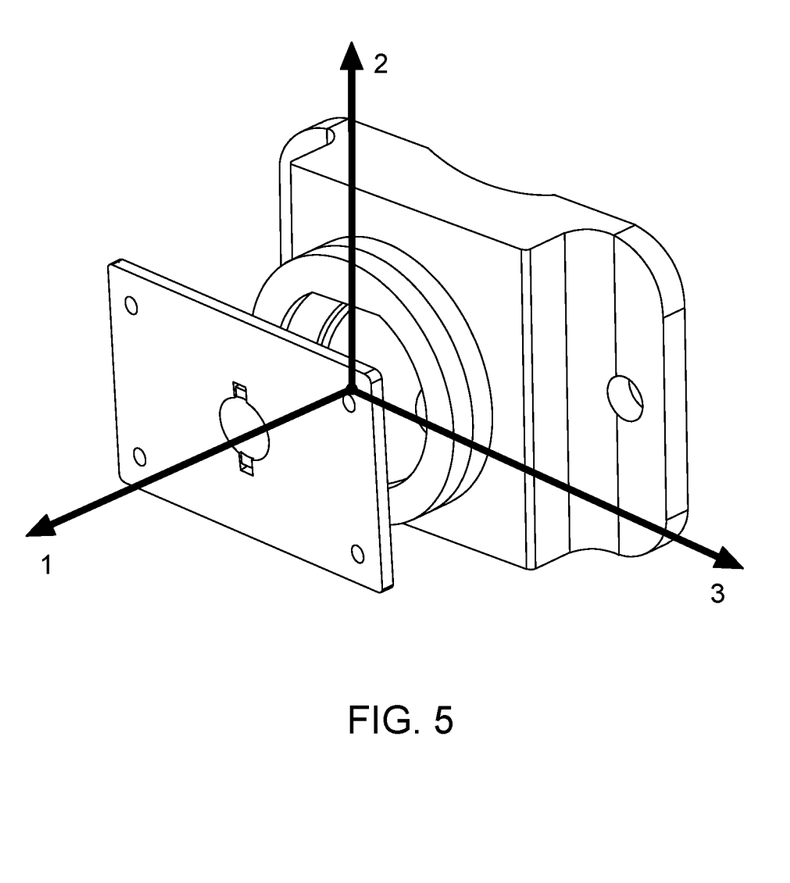
FIG. 5 shows three axes for the ball and socket joint.

FIG. 5 depicts the assembled ball and socket joint 1 in the neutral position with the axes labelled. The longitudinal axis of the shaft 24 is defined herein as the first axis 1. The first axis 1 is also defined in the present embodiment as the axis that is parallel to the plane of the groove 12 and extends through the attachment surface, i.e. the sensor mounting plate 5. As discussed above, the pin 16 and groove 12 are arranged to prevent rotation about the first axis 1.

The axis perpendicular to the longitudinal axis of the shaft 24 (i.e. the first axis 1) is defined herein as the second axis 2. The second axis 2 is also parallel to the axis of the pin 16 in the present embodiment. As discussed above, the pin 16 and groove 12 are arranged to allow rotation about the second axis 2. In the depicted embodiment, rotation about the second axis 2 allows for the sensor mounting plate 5 to be moved side-to-side.

The axis perpendicular to the plane of the groove 12 is defined herein as the third axis 3. The third axis 3 is perpendicular to the first axis 1 and perpendicular to the second axis 2. As discussed above, the pin 16 and the groove 12 are arranged to allow rotation about the third axis 3 in addition to the second axis 2. In the depicted embodiment, rotation about the third axis 3 allows for the sensor mounting plate 5 to be moved upwardly and downwardly with respect to the mounting surface.

This arrangement of the pins 16 and the groove 12 means that the position of the ball 10 within the socket 11 can be adjusted by an installer without any risk of the shaft 24 being twisted along its longitudinal axis or of the attachment surface of the sensor mounting plate 5 being rotated. This is beneficial as may speed up the process of repositioning the ball and it reduces the chance of human error occurring. In the instance of the ball and socket joint 100 being used to mount a sensor, any rotation about the longitudinal axis of the shaft 24 or rotation of the attachment surface of the sensor mounting plate 5 could be detrimental to the operation of the sensor as it could distort the reading. Therefore, when the user is re-positioning the sensor they may have to spend considerable time ensuring that the sensor remains level. The present intention prevents any rotation, thus avoiding this potential issue.

Similarly, the use of the locking nut 20 described above means that the ball and socket joint 100 for mounting a sensor can be assembled and/or adjusted quickly and easily without the need for any additional tools. The user is simply required to rotate the locking nut 20 such that the flat surfaces 14, 18 are aligned, insert the ball 10 into the socket 11 and then rotate the ball to the desired position and rotate the locking nut 20 again so that the flat surfaces 14, 18 are offset from each other.

Figure 6A:
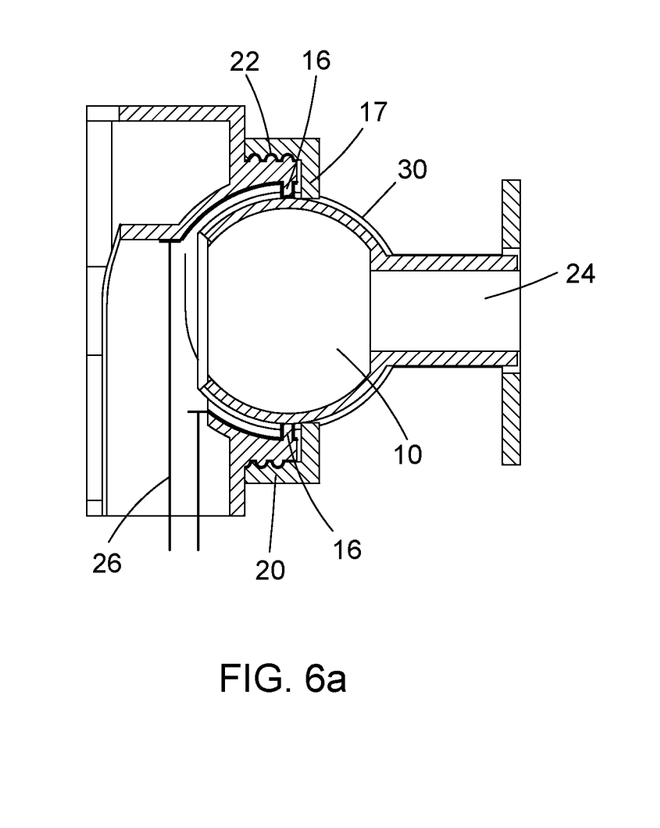
FIGS. 6a and 6b show cross-sections of the ball and socket joint including a tamper circuit.
Figure 6B:
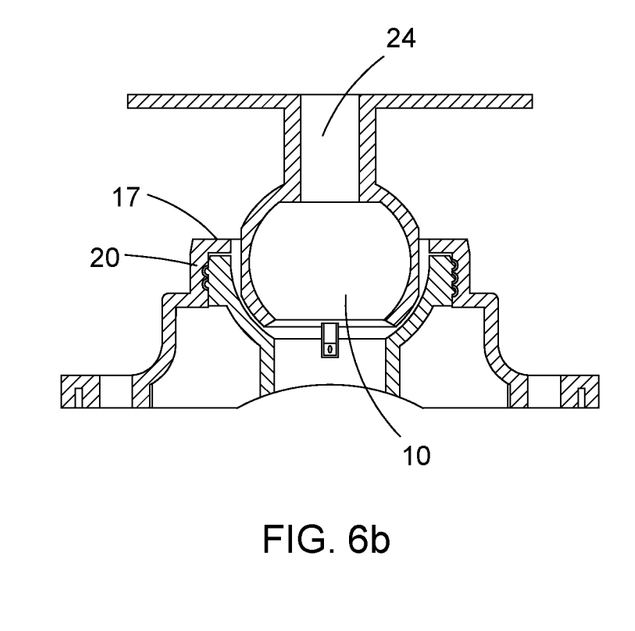

Referring now to FIGS. 6a and 6b, the ball and socket joint 100 also comprises a tamper circuit 26. The pins 16 and groove 12 may be formed of metal or any other conducting material, this may include being coated with a metal or other conducting material.

Once the ball 10 is in position, the locking nut 20 can rotated so that the flat surface 14, 18 are offset from one another and the ball 10 is urged into contact with the socket 11 as discussed in more detail above. Once the ball 10 is urged into the socket 11, the pins 16 will be in firm contact with the groove 12 which forms the connection for the tamper circuit 26. This is the position shown in FIGS. 6a and 6b.

The tamper circuit 26 provides an electrical connection between the sensor mounting plate 5 and the surface mounting plate 4 for mounting the joint 100 to a mounting surface. The electrical connection for the tamper circuit 26 extends along the outer surface of the shaft 24 to the bottom surface of the groove 12 and then through the pin(s) 16 through the socket to an external connection point.

If the locking nut 20 is loosened, the weight of the ball 10 and any sensor or other component mounted to the shaft 24 will cause the ball 10 to move within the socket 11. This movement will cause the pins 16 to lose connection with the surface of the groove 12 and break the connection for the tamper circuit 26. In response an alert may be issued that the ball and socket joint 100 is being tampered with. In the case of the ball and socket joint 100 being used for a sensor installation, the sensor measurement recorded after an alert of tampering has been issued may be marked accordingly.

What is claimed is:

1. A ball and socket joint comprising:
   a socket comprising an opening;
   a ball configured to be located in the socket;
   an attachment surface for attaching a device to the ball and socket joint;
   a pin located on either the socket or the ball, and
   a groove located on the other of the socket or ball,
   wherein the groove is located in a plane defined by a first axis and a second axis, the second axis perpendicular to the first axis,
   wherein the first axis extends through the attachment surface when the ball is located in the socket;
   wherein the pin is configured to engage the groove and can translate along the length of the groove when the ball is located in the socket;
   wherein the pin and groove are arranged to prevent rotation of the ball about the first axis; and
   wherein, when the ball is located in the socket, the pin and groove are arranged to allow rotation about the second axis, and to allow rotation about a third axis perpendicular to the first axis and perpendicular to the second axis,
   wherein the ball and socket joint further comprises a tamper circuit, wherein the surfaces of the pin(s) and groove are conductive, and wherein the conductive surface of the pin(s) and groove provide a connection for the tamper circuit when the ball is located within the socket.

2. The ball and socket joint as claimed in claim 1, wherein the device is a sensor, optionally wherein the ball and socket joint further comprises a sensor mounted to the attachment surface.

3. The ball and socket joint as claimed in claim 1, wherein the pin is located in the socket, and the groove is located on the ball.

4. The ball and socket joint as claimed in claim 1, wherein the pin is a first pin, and the ball and socket joint further comprises a second pin, wherein the first pin and the second pin are diametrically opposite each other such that their axes are coaxial.

5. A ball and socket joint, the ball and socket joint comprising:
   a socket;
   a ball configured to be located within the socket, wherein the ball comprises a first flat surface; and
   a locking nut for locking the ball within the socket,
   wherein the locking nut comprises an opening with a partly circular internal cross section and a second flat surface,
   wherein the locking nut is sized such that when the first flat surface of the ball and the second flat surface of the locking nut are aligned the ball is able to pass through the opening, and such that when the first flat surface and the second flat surface are offset from each other the ball is not able to pass through the opening, and
   wherein the locking nut is configured to be rotatable between a first position where the first flat surface of the ball and the second flat surface of the locking nut are aligned and a second position where the first flat surface and the second flat surface are offset from each other.

6. The ball and socket joint as claimed in claim 5, wherein the socket comprises a threaded surface, and the locking nut comprises a threaded surface that can engage with the threaded surface of the socket.

7. The ball and socket joint as claimed in claim 5, wherein the locking nut is arranged such that it can be rotated relative to the ball and/or socket and used to lock the ball within the socket without any tools.

8. The ball and socket joint as claimed in claim 5, wherein the locking nut is sized such that the minimum internal dimension of the locking nut is larger than the minimum dimension of the ball, and the minimum internal dimension of the locking nut is smaller than the diameter of the ball, wherein the minimum internal dimension of the locking nut is the distance between the second flat surface and the surface diametrically opposite the second flat surface.

9. The ball and socket joint as claimed in claim 5, wherein the ball further comprises a third flat surface diametrically opposite the first flat surface, and the opening of locking nut further comprises a fourth flat surface, diametrically opposite the second flat surface, wherein the locking nut is configured such that when the first flat surface and the second flat surface are aligned or offset, the third flat surface and the fourth flat surface are also aligned or offset respectively.

* * * * *